United States Patent [19]

Ford et al.

[11] Patent Number: 4,691,847

[45] Date of Patent: Sep. 8, 1987

[54] PASTY PRODUCT DISPENSER HAVING COMBINATION ACTUATOR AND OUTLET VALVE

[75] Inventors: John M. B. Ford; David G. Moore, both of Lee's Summit, Mo.

[73] Assignee: Realex Corporation, Kansas City, Mo.

[21] Appl. No.: 565,540

[22] Filed: Dec. 27, 1983

[51] Int. Cl.[4] .............................................. G01F 11/00

[52] U.S. Cl. .................................... 222/259; 222/383; 222/400.5

[58] Field of Search ..................... 222/391, 400.5, 213, 222/401, 402, 324, 517, 556, 511, 259, 256, 207, 386, 389, 257, 260, 380, 383, 384, 385

[56] References Cited

U.S. PATENT DOCUMENTS

| | | | |
|---|---|---|---|
| 1,757,736 | 5/1930 | Pritchard | 103/166.5 |
| 1,879,205 | 9/1932 | Gunn | 222/556 |
| 2,558,314 | 6/1951 | O'Keefe et al. | 222/517 |
| 3,088,636 | 5/1963 | Spatz | 222/206 |
| 3,268,123 | 8/1966 | Spatz | 222/400.5 |
| 3,870,200 | 3/1975 | Spatz | 222/213 |
| 4,394,939 | 7/1983 | Thor et al. | 222/517 |
| 4,413,759 | 11/1983 | Mettenbrink | 222/391 |
| 4,461,403 | 7/1984 | Prahs | 222/391 |

FOREIGN PATENT DOCUMENTS

| | | | |
|---|---|---|---|
| 84638 | 12/1982 | European Pat. Off. . | |
| 3104726 | 8/1982 | Fed. Rep. of Germany | 222/386 |

*Primary Examiner*—Joseph J. Rolla
*Assistant Examiner*—Kenneth Noland
*Attorney, Agent, or Firm*—Schmidt, Johnson, Hovey & Williams

[57] ABSTRACT

The actuating lever of the dispenser has a rigid valve flap integral therewith which covers the spout outlet to close the same when the actuating lever is in its normal, undepressed position but which then lifts off the outlet to open the same when the lever is depressed in a pumping stroke. One embodiment employs a reciprocable pumping piston at one end of the dispenser body and a free-floating take-up piston at the opposite end of the body which responds to the evacuationof material within the pump chamber to take up the space otherwise occupied by the evacuated product. Another embodiment utilizes a pumping piston which starts at the lower end of the dispenser body and is progressively drawn up toward the opposite end during successive pumping strokes by a rod connected to the actuating lever.

5 Claims, 4 Drawing Figures

PASTY PRODUCT DISPENSER HAVING COMBINATION ACTUATOR AND OUTLET VALVE

TECHNICAL FIELD

This invention relates to the field of manually operated pumping dispensers and, more particularly to improvements in dispensers of the type which are especially adapted for handling viscous products such as toothpaste and the like.

BACKGROUND

In dispensers of the subject type, it is desirable in many cases to provide a check valve in association with the discharge passage which will open during a pumping stoke but which will thereafter close so that product is not drawn back into the passage as a result of the vacuum created within the pumping chamber by the discharged product. It is also desirable to be able to effectively seal off the outlet of the discharge spount during periods of nonuse so that ambient air is prevented from entering the outlet and forming an unsightly, caked obstruction to product discharge at that location.

SUMMARY OF THE PRESENT INVENTION

Accordingly, one important object of the present invention is to provide a dispenser having a valve at the outlet of the discharge spout which is structurally combined with the actuating lever of the dispenser in such a way that the valve covers and thus closes the outlet when the actuator is in its standby position but which then lifts from and thereby opens the outlet when the actuating lever is depressed during a pumping stroke.

To this end, the valve and actuating lever are integrated into a unitary structure in which the finger engaging actuator portion of the lever is disposed on one side of the fulcrum point thereof while the spout closing valve portion thereof is located on the opposite side of the fulcrum. Consequently, when the finger-engaging portion of the lever is depressed for discharging the product, the valve portion thereof is rocked upwardly to lift the same off the spout. One form of the invention is utilized in connection with a dispenser wherein a take-up piston at the lower end of the dispenser is free floating and the pumping action is achieved through the use of a reciprocal piston operably coupled with the actuator at the opposite end of the pump body. A second form of the invention contemplates a dispenser in which the pumping piston is disposed at the lower end of the dispenser body initially but is incrementally drawn upwardly toward the discharging spout during successive uses of the dispenser by a connecting rod coupled with the actuating lever and having a one-way connection to the piston such that the latter actually climbs up the rod each time the latter is depressed.

DETAILED DESCRIPTION

Figure 1:
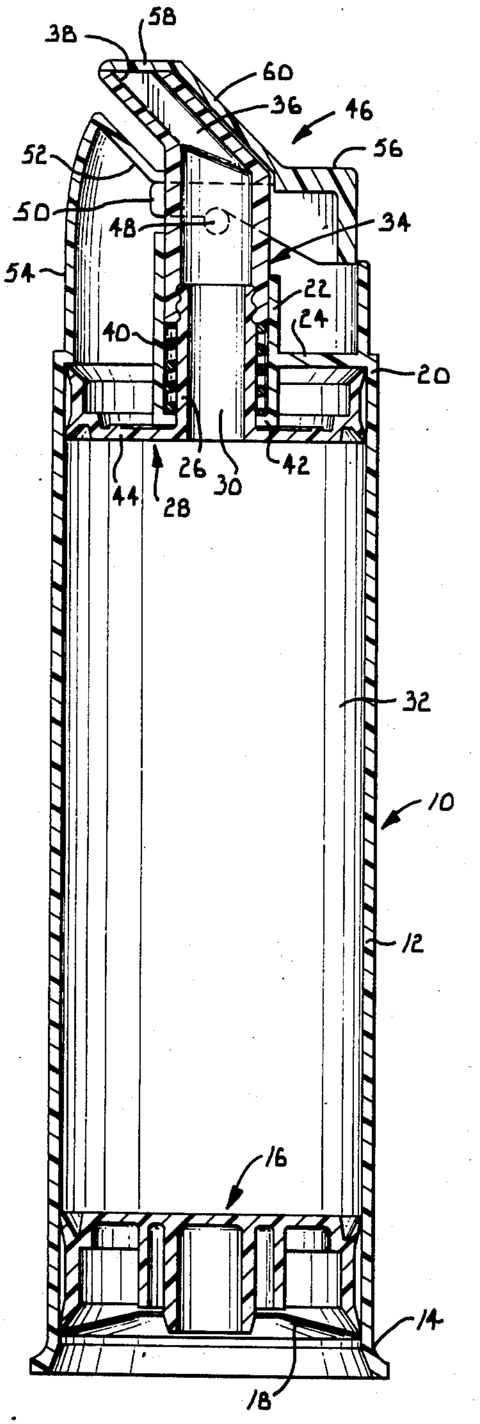
FIG. 1 is a vertical cross-sectional view of a dispenser constructed in accordance with the principles of the present invention with the actuating lever thereof in its undepressed, stand-by position and the spout outlet closed by the valve portion of the lever.
Figure 2:
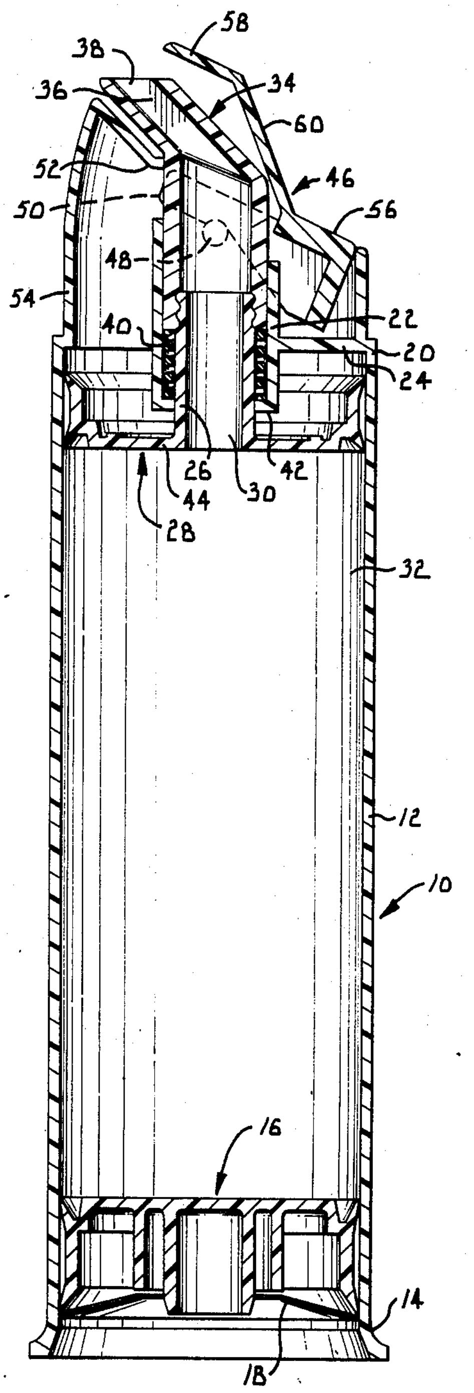
FIG. 2 is a vertical cross-sectional view of the dispenser similar to FIG. 1 but showing the relationship of certain of the components during a pumping stroke when the lever is depressed and the spout outlet is opened.

The dispenser 10 of FIGS. 1 and 2 includes a tubular, cylindrical body 12 which is open at its lower end 14 to the atmosphere, except for the presence of a floating piston 16 which makes sealing engagement with the interior wall surface of the body 12 and has a downwardly and outwardly flaring metal skirt 18 or the like on the bottom side thereof which also engages the interior wall surface of the body 12. The skirt 18 is sufficiently resilient that it will deflect downwardly to any extent necessary to permit the piston 16 to move upwardly in the body 12, yet it is sufficiently stiff as to bite into the wall surface and prevent downward, retrograde movement by the piston 16 within the body 12. The opposite, upper end 20 of the body 12 includes an upright, centrally disposed sleeve 22 which is supported by transversely extending web means 24. The sleeve 22 reciprocably receives the tubular stem 26 of a pumping piston 28 which at its circumferential periphery sealingly engages the inner wall surface of the body 12. A passage 30 is defined within the tubular stem 26, and the two pistons 16 and 28 cooperate with the body 12 to form a pumping chamber 32 therebetween.

The sleeve 22 also partially receives the lower end of a tubular discharge spout 34 which iteself receives the upper end of the plunger stem 26 and is securely attached thereto. A passage 36 is defined within the tubular spout 34, and a discharge outlet 38 is presented at the uppermost end thereof. A coil spring 40 encircles the piston stem 26 and is trapped between the lower extremity of the spout 34 and a lower, in-turned terminus 42 of the sleeve 22 for the purpose of yieldably biasing the piston 28 and the spout 34 toward an upper, undepressed position as illustrated in FIG. 1 as limited by the lower sleeve terminus 42 abutting the inside of the pumping face 44 of piston 28.

The dispenser 10 is also provided with an actuator 46 in the form of a lever having a fulcrum 48 associated with the spout 34. The fulcrum 48 takes the form of a pair of pins projecting laterally from opposite sides of the spout 34, and a pair of legs 50 of the actuator 46 (only one leg 50 being illustrated) straddle the spout 34 and rest at their midpoints on the respective fulcrum pins 48. Forwardmost ends of the legs 50 are retainingly hooked beneath overhanging proximal ledges 52 (only one being shown) on upstanding housing structure 54 at the uper end 20 of the body 12.

The actuator lever 46 includes a fingerengaging portion 56 on one side of the fulcrum pins 48, as well as a valve flap portion 58 on the oposite side of the fulcrum pins 48. The valve portion 58 is integrally connected with the finger-engaging portion 56 by an intermediate web portion 60, and it will be noted that the valve portion 58 is of such a dimension as to completely cover and thereby close the outlet 38 when the actuator 46 is in its FIG. 1 position. If desired, the spout 34 may have an angled upper end as shown in order to best accommodate the valve portion 58 and web portion 60 of actuating lever 46.

OPERATION OF THE FIRST EMBODIMENT

The return spring 40 normally maintains the pumping piston 28, the spout 34 and the actuator 46 in the position of FIG. 1 in which valve flap 58 tightly covers and seals the outlet 38. Upon the application of downwardly directed finger pressure to the operating portion 56 of actuator 46, the latter rocks downwardly about the fulcrum pins 48 in a clockwise direction so that the valve flap 58 is lifted off the outlet 38 as illustrated in FIG. 2. At the same time, because the legs 50 are retained beneath the ledges 52, depression of the operating portion 56 also causes the spout 34 and hence the pumping piston 28 to be shifted downwardly a short distance. This exerts a positive pumping pressure on the product contained within chamber 32, forcing the same upwardly through passages 30 and 36 and out the outlet 38.

When pressure on the operating portion 56 is released, the spring 40 returns the spout 34 to its original raised position of FIG. 1 and likewise forces the pumping piston 28 back to its original position. By virtue of the fulcrum pins 48 moving upwardly at this time and the legs 50 being trapped beneath the ledges 52, the actuator 46 is rocked in a counterclockwise direction about fulcrum pins 48 to thereby return the operating portion 56 to its original undepressed position and lower the valve flap 58 once again into covering relationship with the outlet 38. In view of the evacuation of product within the chamber 32 and the closing of the outlet 38 by valve flap 58, the floating piston 16 is moved upwardly within the chamber 32 by a corresponding amount as atmospheric pressure is applied against the bottom of the piston 16 via the open lower end 14 of the body 12.

DESCRIPTION OF THE SECOND EMBODIMENT

Figure 3:
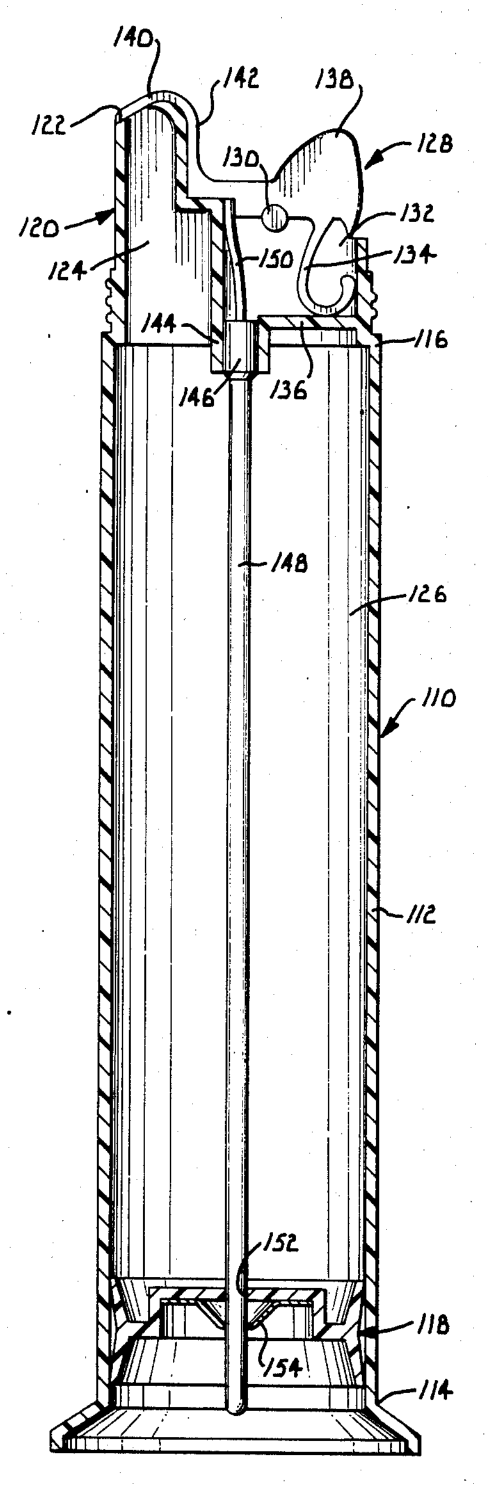
FIG. 3 is a vertical cross-sectional view of a second embodiment of the invention in connection with a dispenser which utilizes a central pull rod to draw a lower pumping piston toward the discharge end of the dispenser during a pumping stroke, the actuating lever being illustrated in its undepressed, standby position and the spout being closed by the valve portion of the actuating lever.
Figure 4:
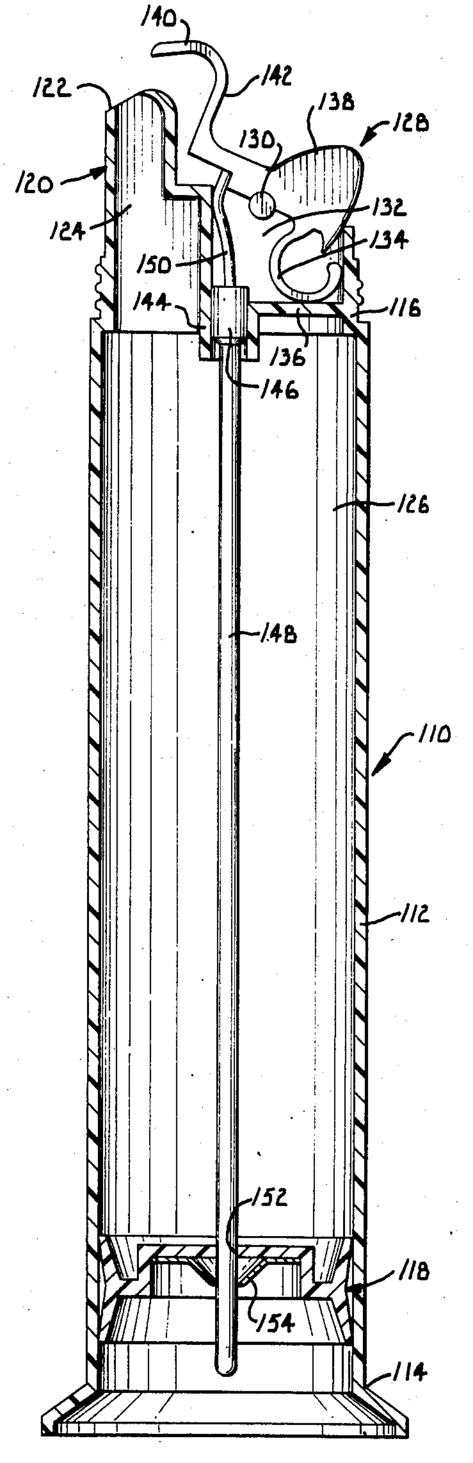
FIG. 4 is a vertical cross-sectional view of the second embodiment of the invention similar to FIG. 3 but illustrating the relationship of the components to one another during a pumping stroke.

FIGS. 3 and 4 are directed to a second dispenser 110 having many features in common with the dispenser 10 of FIGS. 1 and 2. However, because of certain differences between the two embodiments, the reference numerals to be set forth below in connection with the dispenser 110 are not intended to have direct correspondence to reference numerals and components described with respect to the dispenser 10.

With respect to the dispenser 110, a tubular, cylindrical body 112 is provided having a lower end 114 and an upper end 116. A pumping piston 118 is received within the lower end 114 of the body 112 and has its outer periphery sealingly and slidably engaging the inner wall surface of the body 112. The upper end of the body 116 of the body 112 is provided with a discharge spout 120 having an outlet 122 and an interior flow passage 124, there being a pumping chamber 126 defined between the piston 118 on the one hand and the outlet 122 of spout 120 on the other hand.

An actuator 128 for the pumping piston 118 is disposed adjacent the upper end 116 of the body 112 and includes a pair of oppositely transversely outwardly projecting fulcrum pins 130 (only one being shown) which are journaled by upstanding wall structure 132 so that the actuator 128 is adapted for rocking motion in the nature of a lever about the axis of fulcrum pins 130. A resilient, curled spring tail 134 depends from the actuator 128 on the opposite side of the pins 130 from the spout 120 and operably engages a transverse web 136 so as to yieldably bias the actuator 128 in a counterclockwise direction toward its position of FIG. 3.

A finger engaging operating portion 138 is disposed on the same side of the fulcrum pins 130 as the spring 134, while a valve flap portion 140 is disposed on the opposite side of the fulcrum pins 130 and is integrally connected with the finger-engaging portion 138 by an intermediate web 142. Valve flap 140 is so configured and arranged as to tightly cover and seal the outlet 122 when the actuator 128 is in its FIG. 3 position while, when actuator 128 is in its FIG. 4 position, the valve flap 140 is lifted away from the outlet 122 to render the same open and unobstructed for product discharge.

A short, upright sleeve 144 is supported centrally of the body 112 adjacent the upper end 116 thereof by the transverse web 136 and is adapted to reciprocably receive the upper enlarged end 146 of a centrally disposed pull rod 148 extending downwardly to and beyond the pumping piston 118. The upper end 146 of rod 148 is connected to the actuator 128 on the valve side thereof via a resilient connecting link 150 which is operable to transmit pushing and pulling forces to the rod 148 from the actuator 128. On the other hand, the lower end of the rod 148 passes through an opening 152 in the piston 118 and is connected to the latter by anti-retrograde connection means 154. Such connection means 154 may take the form of a suitably downwardly flared metal skirt which permits unrestricted passage of the rod 198 in a downward direction but which bites into the rod 148 when the same is drawn upwardly, thereby causing the piston 118 to likewise move upwardly with the rod 148.

OPERATION OF THE SECOND EMBODIMENT

The spring 134 normally maintains the actuator 128 in the position illustrated in FIG. 3, thereby also normally maintaining the outlet 122 sealed closed by the valve flap 140.

When the operating portion 138 of actuator 128 is depressed, however, as illustrated in FIG. 4, the actuator 128 is rocked in a clockwise direction about the axis of the fulcrum pins 130 to lift the valve flap 140 off the outlet 122 and thereby open the spout 120 for discharge. That action also causes the rod 148 to be pulled upwardly and to bring with it the pumping piston 118, thereby forcing a corresponding quantity of the product out the outlet 122.

When finger pressure on the engaging portion 138 is released, the spring 134 rocks the actuator 128 in a counterclockwise direction back to the FIG. 3 position, thereby reclosing the outlet 122 with the valve flap 140. Such action also pushes the rod 148 downwardly, but because the frictional engagement between the periphery of the piston 118 and the interior wall surface of the body 112 exceeds that resistance offered by the antiretrograde connection means 154, the rod 148 simply slips through the opening 152 and the connection means 154 without imparting any downward motion to the piston 118. Thus, the components of the dispenser 110 are once again in readiness for a pumping cycle.

It will be appreciated that both embodiments of the invention are well adapted to perform their intended functions. In both cases, having the valve flap for the spout outlet integral with and operable by the actuator of the dispenser provides a convenient means of appropriately sealing off the discharge spout against the admission of ambient air during periods of nonuse. Thus, unsightly and flow-obstructing caking of product residue within and around the spout outlet is avoided. Moreover, whereas in the past separate plugs or caps and the like have been utilized to temporarily cover such outlets during nonuse, such components were easily lost or simply discarded by the user with the resultant disadvantages that such action necessarily entails. By having the valve flaps carried by the actuator, such flaps cannot be lost or discarded, and they are always moved from the outlet at the proper time, i.e., when the actuator is operated to dispense product.

With respect to the dispenser 10, it will be appreciated that the valve flap 58 also serves in the capacity of a check valve to prevent significant retrograde movement of product back through the spout 36 in an effort to replenish that portion of the chamber 32 which has been evacuated during the immediately preceding pumping stoke. Consequently, the piston 16 is enabled to float upwardly within the chamber 32 under the influence of atmospheric pressure to decrease the effective volume of the chamber 32 by the amount of the discharged product.

It will of course be understood that the foregoing sets forth but two exemplary embodiments of the present invention. Various modifications within the spirit and scope of this invention will be apparent to those skilled in the art, and such modifications can obviously be made without departing from the underlying principles of the invention.

We claim:

1. A dispenser for pasty products comprising:

a tubular body;

a discharge spout at one end of the body having an outlet;

a floating take-up piston at the opposite end of the body movable toward said spout by atmospheric pressure against the underside of the piston but having anti-reverse means associated therewith preventing movement away from the spout;

a reciprocable pumping piston contained within the body adjacent said one end and cooperating with said floating piston to define a pumping chamber therebetween, said pumping piston having a passage therethrough communicating said chamber with the outlet of the spout, said passage being continuously open along the entire length thereof from said pumping chamber to said outlet of the spout;

a depressible actuator operably coupled with said pumping piston for shifting the latter through a pumping stroke toward the floating piston when the actuator is depressed;

resilient means for returning the actuator to its undepressed position and the pumping piston to its unshifted position following each pumping stroke of the pumping piston; and an external check valve integral with said actuator and movable therewith during said depression and return thereof, said valve being disposed to open and uncover said outlet when the actuator is depressed and to cover and close the outlet from outside of the spout when the actuator is in its undepressed position, whereby to prevent suck-back of product in the spout when the valve is closed before subatmospheric pressure in the body from the retracted pumping piston and dispensed volume of product has drawn product back through the spout.

2. A dispenser as claimed in claim 1, wherein said actuator comprises a lever having a pair of elongated laterally spaced legs disposed on opposite sides of the spout, said legs having a fulcrum connection with the spout for swinging of the lever relative to the spout during actuation, said valve comprising an elongated, rigid flap located generally between said legs in alignment with said spout.

3. A dispenser as claimed in claim 1, wherein said spout includes an endmost, annular edge defining said outlet thereof, said valve comprising a rigid flap having a planar surface overlying and butted against said edge when the valve closes the outlet.

4. A dispenser as claimed in claim 3, wherein said actuator comprises a lever having a pair of elongated laterally spaced legs disposed on opposite sides of the spout, said legs having a fulcrum connection with the spout for swinging of the lever relative to the spout during actuation, said valve flap being located generally between said legs in alignment with said spout.

5. a dispenser as claimed in claim 1, wherein said discharge spout is fixed to the pumping piston for reciprocation therewith.

* * * * *